J. B. NEWBROUGH, OF NEW YORK, N. Y.

Letters Patent No. 84,369, dated November 24, 1868.

IMPROVED COMPOUND OF RUBBER OR GUTTA-PERCHA.

The Schedule referred to in these Letters Patent and making part of the same.

*To all whom it may concern:*

Be it known that I, J. B. NEWBROUGH, of the city, county, and State of New York, have invented a new Composition or Product; and I do hereby declare the following to be a full, clear, and exact description of the same.

My invention consists in the combination of gutta-percha, or other gum, iodine, wolfram, or tungsten-oxide, and clay, or its equivalent, forming a composition which, when subjected to the action of heat, as described hereafter, will become hard, tough, and somewhat elastic.

When iodine is combined directly with rubber or gutta-percha, it is very apt to vulcanize the latter to a greater or less degree while being incorporated with it, thus rendering the composition unfit to be moulded or otherwise shaped.

I have found that wolfram, or tungsten-oxide, when added to iodine and gutta-percha, or other gum, will prevent the latter from becoming hardened during the mixture of the materials, while the preparation thus made, when subjected to heat, will be vulcanized, producing a substance which is hard, tough, and in many respects similar to vulcanized rubber prepared in the usual manner.

When wolfram is used, the color of the product is black. It is blue, however, when tungsten-oxide is employed. But other colors may be produced by the mixture of suitable materials with the composition.

Although the ingredients may be employed in various proportions, I have found it well to use, with every twelve parts of gum, six parts of wolfram or tungsten-oxide, six parts of clay or kaolin, and one part of iodine.

The wolfram, or tungsten, clay, and iodine are ground together, with two parts of water, and, after being thoroughly mixed, are kneaded or worked with the gum until a mass of uniform consistency is produced. This may then be moulded or otherwise formed of the desired shape, and vulcanized in the usual manner.

I claim as my invention, and desire to secure by Letters Patent—

As a new composition, gutta-percha, or India rubber, combined with clay, iodine, and wolfram or tungsten-oxide, substantially as described.

In testimony whereof, I have signed my name to this specification in the presence of two subscribing witnesses.

J. B. NEWBROUGH.

Witnesses:
H. P. CARLSON,
JOS. W. TANTUM.